Feb. 5, 1935. H. A. GREENWALD 1,990,184
POWER TRANSMITTING DEVICE
Filed Sept. 8, 1930 2 Sheets-Sheet 1

INVENTOR
Harold A. Greenwald.
BY
ATTORNEYS.

Feb. 5, 1935.  H. A. GREENWALD  1,990,184
POWER TRANSMITTING DEVICE
Filed Sept. 8, 1930   2 Sheets-Sheet 2
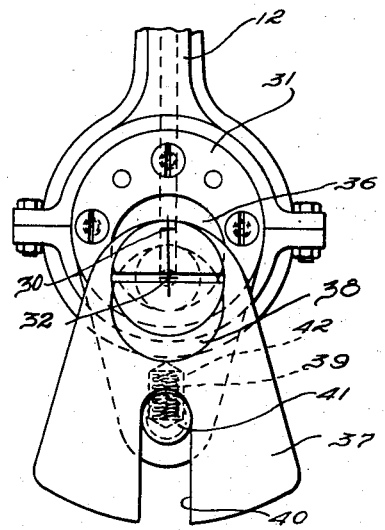
Fig. 4.
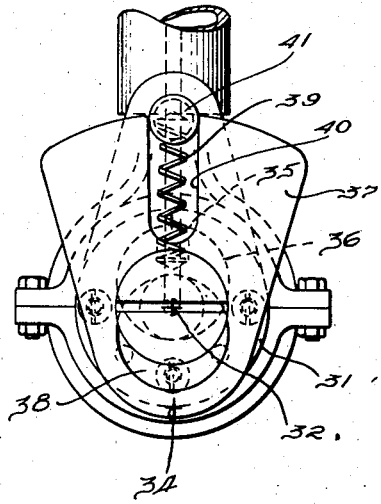
Fig. 5.
Fig. 6.
Fig. 7
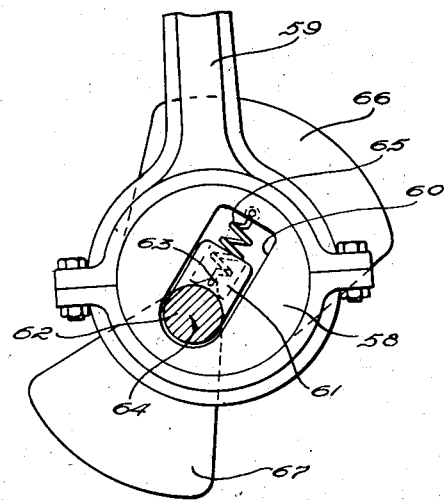
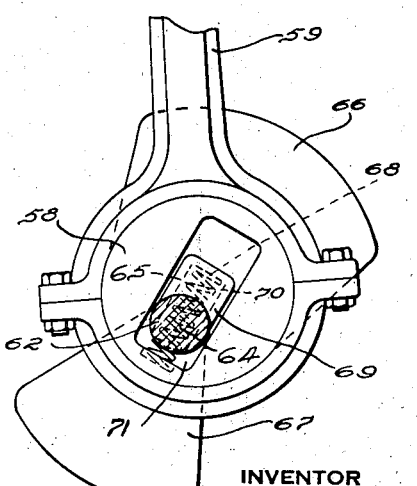
INVENTOR
Harold A. Greenwald.
BY
ATTORNEYS.

Patented Feb. 5, 1935

1,990,184

UNITED STATES PATENT OFFICE 1,990,184

POWER TRANSMITTING DEVICE

Harold A. Greenwald, Detroit, Mich., assignor, by mesne assignments, to Kelvinator Corporation, Detroit, Mich., a corporation of Michigan Application September 8, 1930, Serial No. 480,562

5 Claims. (Cl. 74—571)

This invention relates to power transmitting devices and has as one of its objects to provide mechanism of the type specified automatically operable to gradually apply the load to a prime mover after the latter has attained a predetermined speed thereby materially facilitating starting of the prime mover.

Another advantageous feature of the present invention resides in the provision of mechanism for accomplishing the above result which is extremely simple in design and which lends itself to economical manufacture.

With the foregoing as well as other objects in view, the invention resides in the novel details of construction which will be made more apparent as this description proceeds, especially when considered in connection with the accompanying drawings, wherein:

Figures 4 and 5 are views similar to Figures 2 and 3 showing a modified form of construction;

Figure 6 is a diagrammatic sectional view of another modified form of construction; and Figure 7 is a view similar to Figure 6 showing still another modified form of the invention.

Figure 1:
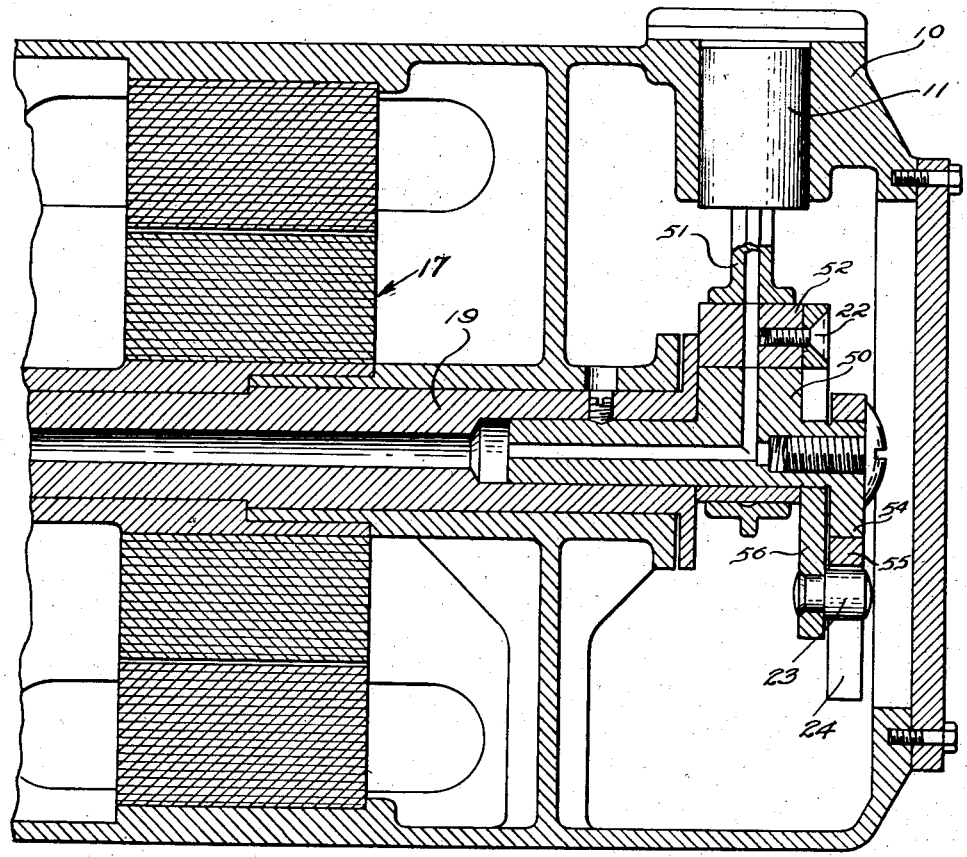
Figure 1 is a side elevational view, partly in section, of a device illustrating one application of my improved power transmitting mechanism.

It is well established in the art that the power required to overcome the inertia of a load and the static friction of the mechanism upon starting is considerably greater than the power required to keep the mechanism and load in motion once it is started. It follows, therefore, that if some means is provided for gradually applying the load upon the prime mover after the same has attained a predetermined speed, a prime mover of less capacity may be utilized, thereby appreciably reducing the cost of installation. Accordingly, the present invention contemplates the provision of means distinguished by its simplicity in construction and operation for automatically and gradually applying the load to a prime mover after the latter has attained a predetermined speed. In general, the mechanism about to be described for accomplishing the foregoing is operated by centrifugal force to connect the driving and driven elements and is so designed that the speed of the driven element connected to the load will be less than the speed of the driving element until the centrifugal force as utilized by the mechanism is sufficient to overcome the load resistance at which time the latter will be directly connected to the prime mover without dependence upon frictional surfaces, as in the case of centrifugal clutches.

The aforesaid mechanism is shown herein for the purpose of illustration as being utilized in connection with a compressor 10 comprising a piston 11 secured in any suitable manner to the upper end of a connecting rod 51 having the lower end thereof operatively connected to an outer eccentric 52. The outer eccentric 52 encircles an inner eccentric 50 and is mounted for rotation relative thereto about the center 18 of the eccentric 50. Inner eccentric 50 is connected to the drive shaft 19 of the prime mover 17.

Referring now more in detail to the manner in which the full load is gradually applied to the prime mover, it will be noted that I provide an arm 56 having one end secured by means of suitable fastener elements 22 to the eccentric 52 and having the opposite end portion extending across the axis of rotation 53 of the inner eccentric 50 and provided with a laterally extending projection 23 at the free end thereof adapted to be received in a suitable open ended slot 24 formed in a weight 55. The weight 55 projects radially outwardly from the axis of rotation 53 of the inner eccentric and is provided with an opening adjacent the end thereof opposite the slot for receiving an eccentric 54 formed integral with the inner eccentric 50. As shown in Figure 1, the eccentric 54 bears a fixed relation to the inner eccentric 50 and projects radially outwardly from one side of the axis 53, while the eccentric 50 projects radially outwardly from the opposite side of the said axis. The centers of the eccentrics 50 and 54, respectively, in addition to being spaced at equal distances upon opposite sides of the axis of rotation 53, are so arranged that a line drawn therethrough will intersect the axis of rotation 53 of the inner eccentric.

Figure 2:
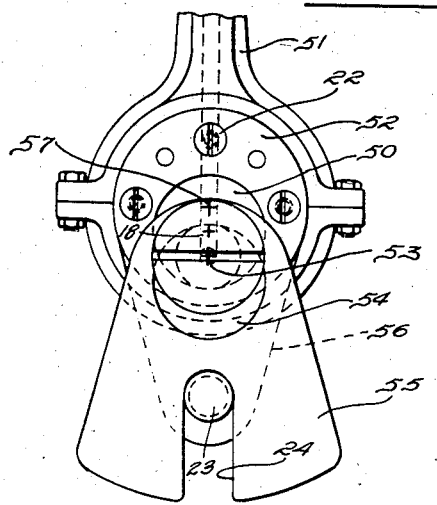
Figure 2 is an end elevation of Figure 1 with certain parts removed for the sake of clearness.
Figure 3:
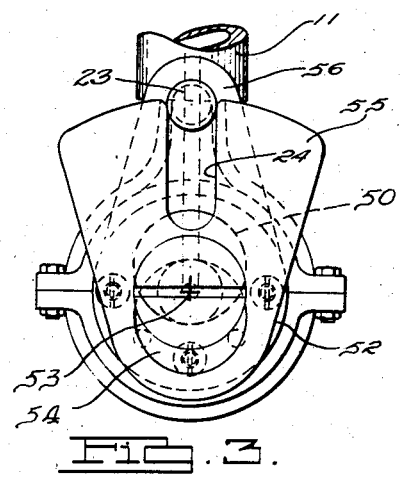
Figure 3 is a view similar to Figure 2 showing the various parts in another position.

As will be apparent from Figures 1 to 3, inclusive, the connecting rod 51 encircles the outermost eccentric 52 with the result that the load actuated by the connecting rod offers an appreciable resistance to rotation of the outer eccentric. Consequently, initial rotation of the inner eccentric 50 causes the eccentrics to assume the positions shown in Figure 3 wherein the outer eccentric 52 is concentric with the axis of rotation 53 of the inner eccentric with the result that rotation of the latter eccentric relative to the outer eccentric imparts a stroke to the connecting rod 51 substantially equal to the throw of the inner eccentric which is necessarily less than the combined throw of both eccentrics. In other words, upon initially starting the prime mover to rotate the inner eccentric, only a portion of the full load is applied to the prime mover.

Rotation of the eccentric 50 causes a corresponding rotation of the eccentric 54 and since this latter eccentric is connected to the weight 55, the weight will be reciprocated initially in a path transversely to the axis of rotation 53. As the speed of the motor increases, reciprocation of the weight 55 is resisted by the momentum of the weight which is controlled by the rate at which the weight is reciprocated by the eccentric 54. Thus, it will be observed that as the angular velocity of the eccentrics 50 and 54 increases, the rate at which the weight 55 reciprocates also increases, thereby building up a greater resistance to the reciprocation of the weight. When the resistance offered the reciprocation of the weight 55 overcomes the resistance of the load, the weight 55 will impart driving impulses to the outer eccentric 52 through the arm 56 tending to rotate the outer eccentric. Rotation of the outer eccentric causes a corresponding rotation of the weight 55, thereby building up a centrifugal force in the latter which tends to maintain the weight in its outermost position, as shown in Figures 1 and 2, wherein the eccentrics 52, 54, weight 55 and arm 56 rotate as a unit. In this connection it is to be noted that upon initial rotation of the outer eccentric 52, the center thereof gradually shifts from the axis of rotation 53 to the point indicated by the reference character 57 in Figure 2, wherein the eccentricity of the outer eccentric cooperates with the inner eccentric to impart full stroke to the connecting rod. Thus, it will be observed that upon starting the prime mover, only a portion of the load is directly applied thereto, and that after the same has attained substantially maximum speed, the remaining portion of the load is gradually applied.

The form of the invention illustrated in Figures 4 and 5 differs from the one previously described in that the power transmitting mechanism is so designed that no load whatsoever is applied to the prime mover upon initially starting the same. In this connection it will be apparent from Figures 4 and 5 that the center 30 of the outer eccentric 31 is so arranged relative to the axis of rotation 32 of the inner eccentric that when the outer eccentric is rotated 180° from the position shown in Figure 4, the center 30 thereof coincides with the axis of rotation 32. When the center 30 of the outer eccentric 31 is coincident with the axis of rotation 32, the high points 34 and 35 of the outer and inner eccentrics 31 and 36, respectively, are arranged upon diametrically opposite sides of the axis 32 and the weight 37 is in its innermost position owing to the relationship of the weight actuating eccentric 38 relative to the outer eccentric 31 as shown in Figure 5. With the parts of the power transmitting mechanism in the relative positions, outlined above, it will be apparent that the eccentrics, weight and actuating arm therefor may be rotated as a unit about the axis 32 of the inner eccentric and since the outer eccentric is arranged concentric with the axis 32, no stroke will be imparted to the connecting rod upon rotation of the outer eccentric. It follows, therefore, that if some means be provided for urging the parts of the power transmitting mechanism to the positions illustrated in Figure 5 upon stopping the prime mover and if means is also provided for resisting outward movement of the weight from the position illustrated in Figure 5, it will be seen that upon starting the prime mover, the eccentrics and weight will merely rotate as a unit about the axis 32 of the driven shaft imparting no load whatsoever to the prime mover.

In order to insure return of the eccentrics to the positions illustrated in Figure 5 and also to normally hold the weight in its innermost position, I provide a spring 39 arranged within the slot 40 in the weight 37 with one end thereof engaging the pin 41 projecting laterally from the weight actuating arm and the opposite end engaging the inner surface of the weight as at 42. Thus, it will be seen that upon starting the prime mover when the power transmitting mechanism is in the position shown in Figure 5, the outer eccentric 31 will rotate about the axis 32 and owing to the relation of the outer eccentric and inner eccentric, previously described, the latter will also be rotated as a unit with the outer eccentric. It will further be seen that any tendency for the eccentric 33 to reciprocate the weight or move the same outwardly is resisted by the spring 39 with the result that the weight will also be rotated as a unit about the axis 32. The force of the spring is so selected that the same will resist outward movement of the weight and relative movements of the eccentrics until the centrifugal force as utilized by the mechanism developed by the weight during rotation thereof becomes greater than the resistance of the load offered by the connecting rod 12. As soon as the centrifugal force exceeds the force as utilized by the mechanism tending to maintain the connecting rod stationary, the weight 37 will tend to move outwardly against the action of the spring 39 and in so doing rotates the outer eccentric 31 relative to the inner eccentric 36 until the high points of the eccentrics 34 and 35 reach the position shown in Figure 4 at which time full stroke is applied to the connecting rod. With the foregoing arrangement, it will be obvious that practically no load is applied to the prime mover until the same approaches its maximum speed and moreover, that the load will be gradually applied to the prime mover as the outer eccentric moves from the position illustrated in Figure 5 to the position shown in Figure 4.

In the event it is desired to obtain the advantages pointed out in the modified form of the invention illustrated in Figures 4 and 5 or, in other words, to permit starting of the prime mover under no load, a spring may be applied to the mechanism shown in Figures 1 to 3, inclusive, in the same manner as brought out in connection with the modified form of invention shown in Figures 4 and 5. When utilizing a spring in the instant case, the operation of the same is identical to the operation pointed out in connection with the modification illustrated in Figures 4 and 5.

The construction illustrated in Figure 6 differs radically from the foregoing modifications in that only a single eccentric 58 is utilized for actuating the connecting rod 59 and piston associated therewith. The eccentric 58 is provided with an elongated transversely extending slot 60 for receiving a projection 61 on the drive shaft 62. The arrangement is such as to prevent relative rotation of the eccentric and drive shaft, but to permit sliding movement of the eccentric transversely to the axis of the drive shaft. The axis of the eccentric designated by the reference character 63 is normally urged to coincide with the axis of rotation 64 of the drive shaft 62 by means of a tension spring 65 disposed within the slot 60 and having one end engaging within the enlargement 61 on the shaft 62. The construction is such that when the parts are stationary, the spring 65 functions to urge the axes 63 and 64 in alignment, as specified above, so that the eccentric 58 will assume a position substantially concentric with the drive shaft 62 and as a consequence upon initially starting the latter, no motion whatsoever will be imparted to the connecting rod 59. However, as the speed of rotation of the drive shaft 62 increases, centrifugal force will overcome the action of the spring 65 gradually moving the axis 63 of the eccentric away from the axis of rotation 64 of the drive shaft until the parts assume the position illustrated in Figure 6. In this connection it is to be noted that as the axis 63 of the eccentric moves radially outwardly from the axis of rotation 64 of the drive shaft, the eccentricity of the member 58 relative to the drive shaft increases with the result that the stroke of the connecting rod increases accordingly. Thus, it will be observed that the load is gradually placed on the drive shaft thereby materially facilitating the starting of the device. In order to assist the eccentric 58 in building up sufficient centrifugal force, I provide a weight 66 secured to the eccentric at the high side thereof with the center of gravity thereof preferably in alignment with the high point of the eccentric. In order to provide an efficient construction, a second weight 67 is secured to the shaft 64 in such a manner as to counterbalance the weight 66 and to also counteract the inertia forces of the connecting rod and piston.

The modification illustrated in Figure 7 is similar in operation to the construction shown in Figure 6, but differs slightly in construction in that a compression spring 68 is provided for normally urging the axes of the eccentric and drive shaft in alignment. As shown, the spring 68 is disposed within a tubular enlargement 69 on the drive shaft and extends through a slot 70 in the drive shaft transverse to the axis thereof and engages the adjacent wall of the slot 71. The construction just described functions in the same manner as the previously described form shown in Figure 9 for effecting a gradual assumption of the load by the drive shaft.

While several embodiments of the invention have been shown and described somewhat herein in detail, it is to be noted that various changes may be made in the details of construction without departing from the spirit and scope of the claims and accordingly reservation is made to make such changes as may come within the purview of the accompanying claims.

What I claim as my invention is:

1. In a power transmitting device, the combination of a rotatable eccentric having a fixed axis of rotation, a second eccentric rotatably mounted upon the eccentric aforesaid, means for rotating the second eccentric about the center of the first-mentioned eccentric, an arm secured to the second eccentric and extending radially across the fixed axis of rotation aforesaid, a third eccentric bearing a fixed relation to the first-mentioned eccentric and having the same axis of rotation, and a weight actuated by said third eccentric and having a slidable connection with said arm whereby rotation of the second eccentric effects a combined rotational and reciprocable movement of the weight about said third eccentric until the centrifugal force set up by the weight becomes sufficient to prevent radial inward movement of the weight, thereby causing the second and third eccentrics to rotate.

2. In a power transmitting device, the combination of a pair of interfitting eccentrics adapted to assume a position wherein the center of the outer eccentric coincides with the axis of rotation of the inner eccentric, means operatively connected to one of the eccentrics tending to rotate the same relative to the other, means operatively connected to one of the eccentrics for rotating both of the eccentrics as a unit when in the aforesaid relative positions, and means depending upon the speed of rotation of the eccentrics for moving one of the latter relative to the other and thereby position the center of the outer eccentric at a point spaced radially outwardly from the axis of rotation.

3. In a power transmitting device, the combination of an eccentric having a fixed axis of rotation, a second eccentric rotatably mounted upon the eccentric aforesaid, means operatively connected to the inner eccentric for rotating the same, a third eccentric bearing a fixed relation to the inner eccentric and rotatable therewith as a unit, a weight extending radially outwardly from the axis of rotation of the inner eccentric and adapted to be reciprocated by the third eccentric, and means operable when the speed of reciprocation of the weight exceeds a predetermined magnitude to impart driving impulses to the outer eccentric.

4. In a power transmitting device, the combination of a rotatable eccentric having a fixed axis of rotation, a second eccentric mounted for rotation upon the eccentric aforesaid, a third eccentric rotatable as a unit with said first-mentioned eccentric and having the center of mass thereof in substantial alignment with the center of mass of the first-mentioned eccentric and arranged on the opposite sides of the axis of rotation, a weight mounted for reciprocation by said third eccentric upon rotation thereof, and a connection between said weight and first-named eccentric whereby rotation of one of said eccentrics effects a combined rotational and reciprocable movement of said weight until the centrifugal force set up thereby becomes sufficient to prevent radial inward movement of the same at which time said eccentrics will rotate as a unit.

5. In a power transmitting device, the combination with an eccentric having a fixed axis of rotation, a second eccentric rotatably mounted with respect to the eccentric aforesaid, means operatively connected with the first eccentric for rotating the same, a third eccentric bearing a fixed relation to the first eccentric and rotatable therewith as a unit, a weight extending outwardly from the axis of rotation of the first eccentric and adapted to be reciprocated by the third eccentric, and driving means between the weight and second mentioned eccentric, said driving means including a radially slidable connection.

HAROLD A. GREENWALD.